United States Patent [19]
Betzen

[11] Patent Number: 5,894,818
[45] Date of Patent: Apr. 20, 1999

[54] ELECTRIC ANIMAL REPELLING AND TRAINING DEVICE

[76] Inventor: Keith Betzen, P.O. Box 5604, Bloomington, Ind. 47407-5604

[21] Appl. No.: 08/895,433

[22] Filed: Jul. 16, 1997

[51] Int. Cl.⁶ .................................................. A01K 15/00
[52] U.S. Cl. ................................................... 119/712
[58] Field of Search .............................. 231/7; 119/712; 43/98, 112, 124

[56] References Cited

U.S. PATENT DOCUMENTS

| | | | |
|---|---|---|---|
| 922,377 | 5/1909 | Ames | 43/98 |
| 2,579,178 | 12/1951 | Dierking . | |
| 3,161,005 | 12/1964 | Ackerson . | |
| 3,717,802 | 2/1973 | Plevy et al. | 317/262 S |
| 3,747,897 | 7/1973 | Conley | 256/10 |
| 3,799,105 | 3/1974 | Porter | 116/22 A |
| 3,900,770 | 8/1975 | Kaufman | 317/148.58 |
| 4,153,009 | 5/1979 | Boyle | 119/29 |
| 4,200,809 | 4/1980 | Madsen | 307/132 |
| 4,394,583 | 7/1983 | Standing | 307/108 |
| 4,476,810 | 10/1984 | Heras | 119/29 |
| 4,566,085 | 1/1986 | Weinberg | 367/139 |
| 4,630,571 | 12/1986 | Palmer | 119/712 |
| 4,890,571 | 1/1990 | Gaskill | 116/22 |
| 4,965,070 | 10/1990 | Messina | 424/581 |
| 4,969,418 | 11/1990 | Jones | 119/29 |
| 5,009,192 | 4/1991 | Burman | 119/29 |
| 5,095,646 | 3/1992 | Bunkers | 43/98 |
| 5,148,621 | 9/1992 | Rosen | 43/1 |
| 5,183,661 | 2/1993 | Messina | 424/405 |
| 5,369,909 | 12/1994 | Murphy | 43/112 |
| 5,381,298 | 1/1995 | Shaw | 361/232 |
| 5,458,093 | 10/1995 | MacMillan | 119/720 |
| 5,460,123 | 10/1995 | Kolz | 119/220 |
| 5,514,919 | 5/1996 | Walley | 307/109 |
| 5,554,377 | 9/1996 | Abraham | 424/405 |
| 5,602,523 | 2/1997 | Turchloe et al. | 340/384.2 |

FOREIGN PATENT DOCUMENTS

| | | | |
|---|---|---|---|
| 440270 | 2/1912 | France | 43/98 |
| 82560 | 3/1919 | Switzerland | 43/98 |

OTHER PUBLICATIONS

Calvert National Office of Industry Property—French Republic Jul. 1912.

Baumann Dept. of Intellectual Property—Switzerland Mar. 1919.

*Primary Examiner*—Thomas Price

[57] ABSTRACT

In order to protect yards, gardens and other areas from the destruction caused by deer and other animal pests, a portable, wireless animal repelling and training device is provided, consisting of a field unit and a charging unit. The field unit has a capacitor to provide a voltage across bare electrodes on the top of the device. The device is baited between the electrodes so that an animal pest smelling or licking at the device will close the circuit between the electrodes and receive an electric shock. The field unit capacitor is charged using a portable, battery-powered charging unit, or alternatively the device may have the charging circuitry and battery contained within the field unit. The devices are positioned around the plants or articles to be protected.

2 Claims, 2 Drawing Sheets

ELECTRIC ANIMAL REPELLING AND TRAINING DEVICE

FIELD OF THE INVENTION

This invention relates to electric animal repelling and training devices, particularly to a portable, wireless, baited device which delivers a shock to an animal attracted to the bait.

BACKGROUND OF THE INVENTION

Prevention and control of wildlife damage to yards, gardens and landscaping is an age old problem. As the population of deer in many areas is increasing, the damage they cause is also increasing. The magnitude of the problem is indicated by the many types of devices and methods that have been used in attempts to discourage marauding deer.

The ultimate barrier against deer is a woven-wire perimeter fence eight feet tall, but this solution is expensive and unsightly and may violate some zoning ordinances or restrictive covenants.

Natural and chemical repellents are available which can be odor repellents to treat the area, or contact repellents to make the plants taste bad. Many chemicals such as denatonium benzoate and thiram have been tried, as well as mixtures of chemicals with hot sauce, eggs, and glue as in U.S. Pat. No. 4,965,070 (1990) and U.S. Pat. No. 5,183,661 to Messina (1993). Natural remedies have been tried such as extracts of the African Marigold as shown in U.S. Pat. No. 5,554,377 to Abraham (1996). Also touted as animal repellents are coyote urine, lion feces, fermented blood, shredded deodorant soap, garlic, feather meal, cat feces, moth balls, creosote and bags of human hair. These repellents are of questionable efficacy, they require constant reapplication, are malodorous and many chemicals are toxic.

U.S. Pat. No. 5,009,192 to Burman (1991) and U.S. Pat. No. 5,458,093 to MacMillan (1995) show animal repellent devices that suddenly spray water when activated by a motion sensor or an infrared sensor. These devices require connections such as a 110 volt supply, compressed air and a high pressure water supply to operate. These devices would not be useful in sub-freezing temperatures and they would be a surprise for the gardener if they were not disarmed when she went to work in the garden.

Scarecrows, strobe lights and noise making devices such as propane exploders, fireworks, sirens and gunfire have been used to deter deer. U.S. Pat. No. 3,799,105 to Porter (1974) and U.S. Pat. No. 5,148,621 to Rosen (1992) show complicated mechanical devices intended to act as scarecrows by the sights and sounds that they produce. Both of these devices require a 110 volt power supply. Another deer scarecrow with provisions for scent and sound making means is shown by U.S. Pat. No. 4,890,571 to Gaskill (1990). Noise making devices such as these are very annoying to nearby humans, especially at night which is when the deer are most likely to be around. Noise making devices and scarecrows have proven to be ineffective because deer are intelligent and soon realize that this type of device will not harm them.

Ultrasonic animal repellents have been described. U.S. Pat. No. 4,566,085 to Weinberg (1986) and U.S. Pat. No. 5,602,523 to Turchioe (1997) describe devices that produces ultrasound of varying frequencies. As with scarecrows, deer soon learn that these devices are of no threat to them.

Deer are intelligent animals and they soon learn to ignore most deterrent devices. The exception to this are repellent and training devices which deliver an electric shock. Use of shock producing devices has been shown to result in immediate retreat and learned avoidance behaviors. Many shock-producing animal training devices are dependent upon placing a collar on the animal and so are of no value in dealing with wild animals. Another type of device is shown by U.S. Pat. No. 2,579,178 to Dierking (1951) with a shocking apparatus powered by the spark plug of a gasoline engine. An animal carcass such as a rabbit is electrified to train dogs to avoid this type of animal. This device produces whole body shocks and would not be practical as a deer repellent device. U.S. Pat. No. 4,153,009 to Boyle (1979) shows a device to provide a continuous direct current to an animal chewing on a bandage. The low voltage of this device, 9–69 volts direct current, comes directly from the batteries. While this device provides a mild irritant to a dog chewing on a bandage, it does not provide the sharp, powerful stimulus required to be effective as a wild animal deterrent. U.S. Pat. No. 4,476,810 to Heras (1984) shows a dog training device which requires the animal to bite an electrified steak in a precise way to close the circuit and deliver a continuous electric shock which consists of a pulsating direct current. U.S. Pat. No. 4,630,571 to Palmer (1986) shows a device to repel animals which involves a high resistance circuit passing through the body and feet of the target animal and which depends upon the moisture of the earth to conduct the 12 volt direct current used in this device.

Other electrically powered, baited animal extermination devices such as shown by U.S. Pat. No. 922,377 to Ames (1909), French Patent 440,270 to Calvert (1912), Swiss Patent 82,560 to Baumann (1919) and U.S. Pat. No. 5,095,646 to Bunkers (1992) are powered by alternating current or a current from a battery and a converter that is powerful enough to kill the intended victim. These devices would be far too dangerous to openly deploy around a yard or garden and they require a connection to an AC power source or a large battery to maintain such a high voltage and amperage.

Gardeners have found that, other than a tall perimeter fence, the most effective devices now available to protect their gardens from deer and other pests are electric fences or electric meshes. Modern fence charging devices are shown by U.S. Pat. No. 3,900,770 to Kaufman (1975), U.S. Pat. No. 4,394,583 to Standing (1983), U.S. Pat. No. 5,381,298 to Shaw (1995) and U.S. Pat. No. 5,514,919 to Walley (1996). Although these devices incorporate large capacitors which serve to stabilize the output of the device, or which discharge through output transformers to provide an extremely high voltage, none of these devices suggest the device of the present invention and all of these devices require a 120 volt AC power source or a large automobile type battery.

To protect yards and gardens, electric fences that are baited with an attractant such as peanut butter have been shown to be especially effective. Other types of baited electric fence devices are shown by U.S. Pat. No. 3,747,897 to Conley (1973) which combines a noxious repellent with an electric shock to repel predators of livestock, and by U.S. Pat. No. 5,369,909 to Murphy (1994) which shows a bait-holding addition to an electric fence to kill insects.

Electric fences, baited or not, have the problems of being unsightly, expensive, difficult to work around and somewhat permanent. In addition, electric fences produce dangerous whole-body shocks, the amperage and voltage are very high because of the high resistance circuit, and the shock produced is continuous pulses, all of which increase the chance of health problems for an accidental victim with this type of device.

SUMMARY OF THE INVENTION

It is evident that the prior art devices disclosed herein suffer from a number of disadvantages and that these devices lack the right combination of features to effectively solve the problem of destruction caused by hungry deer in yards and gardens.

Specifically, the power supply and delivery systems in these prior art devices are unsatisfactory in one way or another. Batteries alone cannot produce the high voltage required for an effective animal training device, batteries coupled directly with a transformer or voltage converter will soon be drained of power, and the devices that suggest very high currents or alternating current at 120 volts or 240 volts are far too dangerous to deploy in most areas. The devices which produce a continuous current or continuous pulses of current consume large amounts of power and are unsafe at higher voltages. Devices which produce whole body shocks have a high resistance path which requires an extremely high voltage power source which is dangerous for target animals and accidental victims. Devices that require an AC connection are not wireless, while devices that require a large automobile type battery are not easily portable.

More specifically, the prior art does not provide an animal repellent device in which the high voltage maintained across the electrodes is stored in a circuit which, in its simplest form, is nothing more than a capacitor. The simple innovation of using a capacitor in the manner illustrated in the present invention, allows the presentation of a small, easily portable, wireless device which delivers a single pulse of high voltage energy which has a very low amperage, a very short discharge time and a short current path through the target animal's sensitive nose, lips and tongue as the animal is attracted to the bait. Also, since the high voltage energy is stored in a capacitor, this device is very efficient having a very long battery life in the self-charging embodiment, or it requires no batteries at all in the embodiment having a field unit that is charged with an external charging means. No prior art suggests using a device as simple as a capacitor alone to power an animal repelling device. No prior art suggests using a capacitor with a timing circuit to intermittently charge the capacitor. Accordingly, various objects and features of the device of the present invention are described subsequently.

A principal object of the present invention is to provide an effective and efficient device for repelling deer and other animals which delivers a strong electric shock when pests are attracted to the bait. In the area where these devices are deployed, target animals are attracted to the bait on the device before they are attracted to the plants or articles being protected. Because the moist areas of the nose, lips and tongue make excellent contacts and the current path of the device is short, a strong voltage is readily delivered, requiring only that the animal smell or lick the bait.

Another object of the present invention is to provide a deer repellent device which trains the deer to stay out of the protected area. The sudden, powerful electric shock causes a painful and startling experience which the deer remembers causing this device to have a scarecrow effect, so that in the future, sight recognition of the device or the smell of the bait will cause deer to avoid the entire area where the devices are located. Also, the sudden reaction of the deer being shocked will startle any other deer nearby and they will all leave the area and be reluctant to return.

Another object of the present invention is to provide a deer repellent device which is non-toxic and is safe both for the target animal and for accidental victims. The current produced by this device has a very low amperage and a duration of only about a millisecond. Also, the current path of this device is short and so the shock delivered is localized, being confined to that small area of the body coming between the closely-placed electrodes. This device is clearly marked as a shock hazard and it is brightly colored as a warning. The device can be easily removed from an area when children or pets are present. The device can be charged to varying voltages with the lower voltages being useful for training pets to avoid the devices.

Another object of the present invention is to provide an animal repellent device which is versatile and convenient. This small, portable device can be easily positioned around the plants or articles to be protected. The device weighs only a few ounces and can be easily moved from place to place or removed when not needed.

Other features include inexpensive construction, silent operation and an esthetic appearance. The device is small and it could be disguised as a flower or other natural object.

Therefore, this device functions much like a portable, baited, wireless electric fence without the disadvantages and dangers associated with an electric fence.

It can be seen that the right combination of features incorporated into the device of the present invention solves prior problems associated with deer repellent devices and produces new and unobvious results that have not been produced by the prior art.

Additional features will become apparent from a consideration of the ensuing drawings and description.

DESCRIPTION OF THE PREFERRED EMBODIMENTS

Typical embodiments of the present invention are illustrated in FIGS. 1–4.

Figure 1:
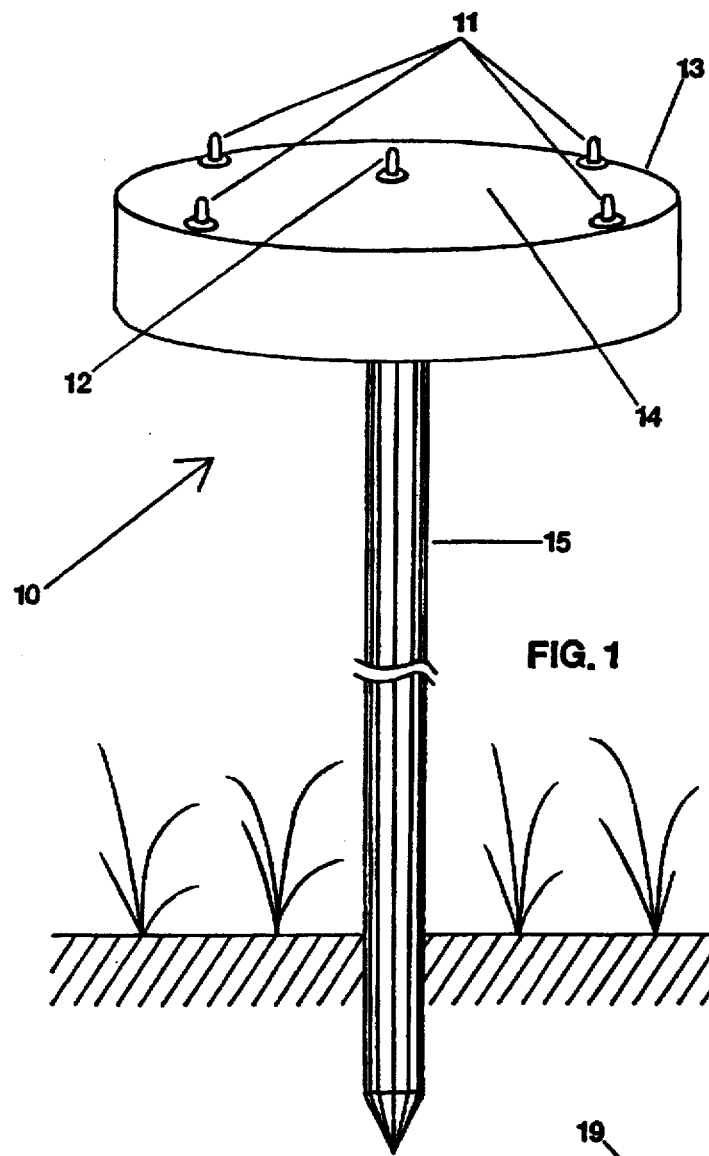
FIG. 1 shows a perspective of one embodiment of the field unit of the invention.

FIG. 1 shows the animal repelling field unit 10 with the bare positive electrodes 11 and the bare negative electrode 12 protruding through the protective housing 13. This embodiment has the electrodes about one inch apart. The device is baited with peanut butter or other bait in the area for bait 14 between the electrodes so that an animal pest smelling or licking at the bait will close the circuit between the electrodes and so receive a shock. The protective housing 13 is supported by the mounting post 15 for pushing into the ground.

Figure 2:
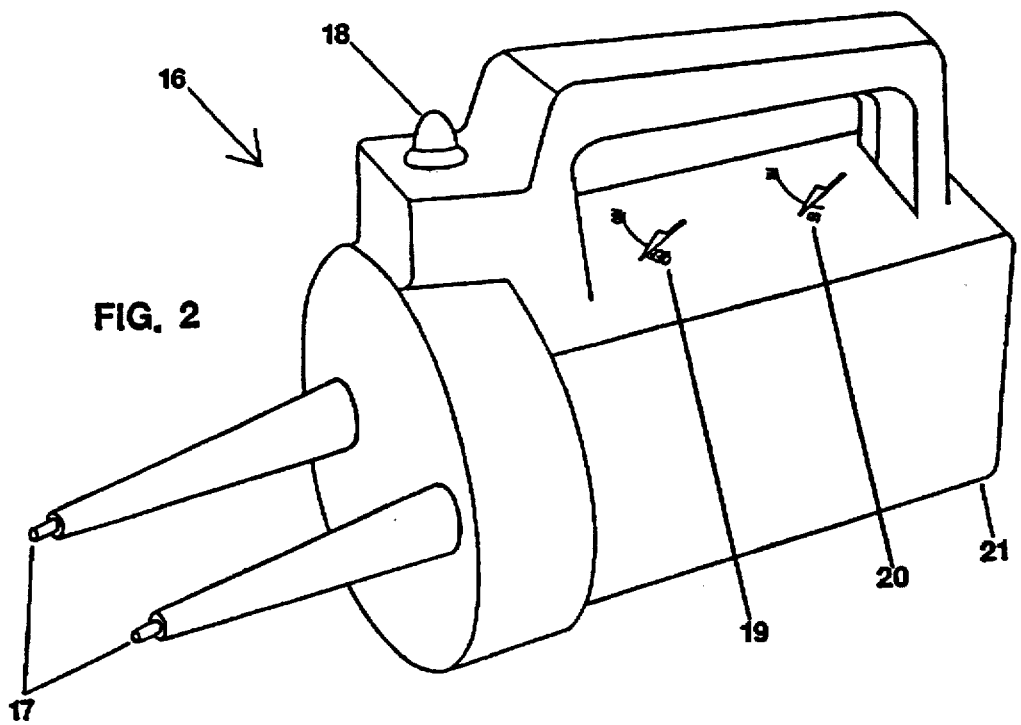
FIG. 2 shows a perspective of one embodiment of the charging unit of the invention.

FIG. 2 shows a perspective of one embodiment of the charging unit 16 with the charging extensions 17 to be held against the positive and negative electrodes of the field unit while the push button switch 18 is depressed to charge the capacitor in the field unit. The charging unit 16 has a single-pole, single-throw switch 19 to activate the transformer and a potentiometer 20 to adjust the voltage output. The carrying case 21 houses the six volt spotlight battery and electronic components shown in FIG. 3.

Figure 3:
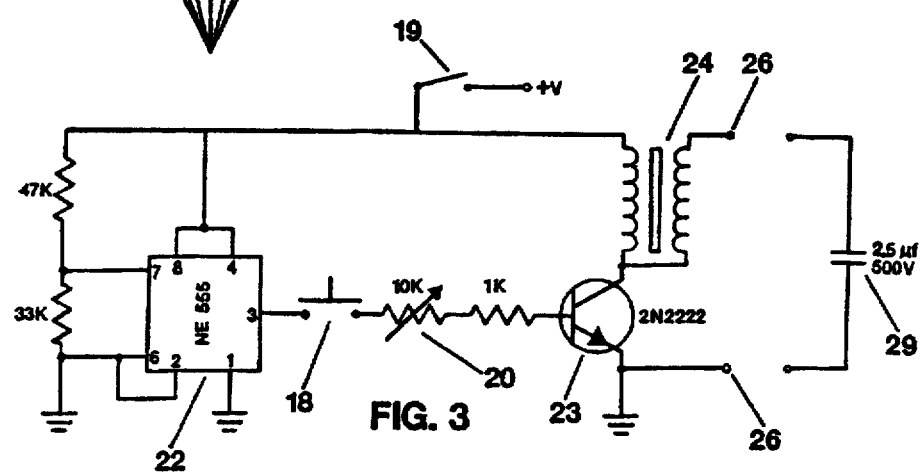
FIG. 3 shows a schematic diagram of the circuitry for the charging unit when the charging unit is a separate entity from the field unit.

FIG. 3 shows a schematic diagram of a typical circuit for producing the electric discharge to charge the field unit capacitor 29. This circuit is contained in the charging unit shown in FIG. 2. An integrated circuit timer 22 and a switching transistor 23 are used to supply a burst of voltage pulses to the transformer 24 each time the push-button switch 18 is pushed. The transformer 24 has 70 turns of No. 32 wire in the primary winding and 2400 turns of No. 43 wire in the secondary winding which produces about 440 volts. In this embodiment the voltage delivered to the output terminals 26 and hence to the field unit capacitor 29 can be changed from low to high using the potentiometer 20 with the low settings being used to train pets to avoid these devices. The charging unit circuit is turned on and off using a single-pole, single-throw switch 19.

Figure 4:
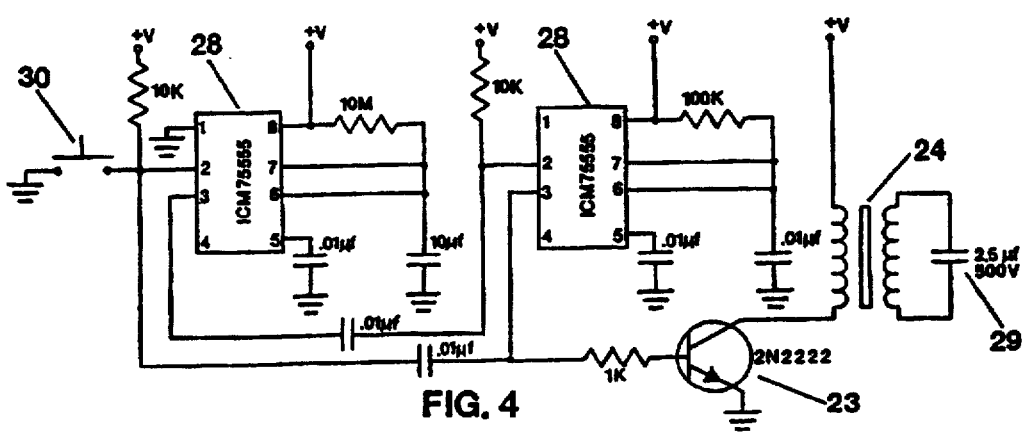
FIG. 4 shows a schematic diagram of the circuitry for a device that has the battery and charging circuitry contained in the field unit itself.

FIG. 4 shows another embodiment with a schematic diagram of the circuitry for a device with the battery and charging circuitry contained in the field unit itself. This circuit uses the same switching transistor 23 and transformer 24 as the circuit in FIG. 3, with the low power integrated circuit timers 28 producing a ten millisecond voltage pulse every hour and a half to maintain the charge on the field unit capacitor 29. Charging is initiated by pressing push-button switch 30. The power supply for this embodiment is a 9 volt battery. All components of the circuits shown in FIGS. 3 and 4 are ¼ watt power rating and these components are commercially available.

The description of the present invention contained herein is an exemplification of typical embodiments and is considered as illustrative only of the principles of this invention. Although this description contains various specificities, these should not be construed as limitations on the scope of this invention. This device can be made with various numbers and configurations of electrodes, or it could be made so that the housing acts as one pole of the circuit with the other pole connected to protruding electrodes which are insulated from the housing. It can operate with various electronic circuits and at a wide range of voltages, it can be used with various mounting assemblies, and other deterrents such as sharp sounds or noxious sprays may be incorporated into it. Other changes in size, color, materials, shape, form, function and manner of operation, assembly and use, are deemed readily apparent and do not depart from the scope of the present invention which is limited only by the following claims and their legal equivalents.

What is claimed is:

1. An animal repelling and training device comprising a field unit with a protective housing supporting a plurality of bare electrodes, an area to bait said device so that an animal pest licking or smelling said bait will close the circuit between said electrodes and so receive an electric shock, support means to position said device to protect the desired area, and a means to maintain a predetermined voltage across said electrodes, the improvement wherein said means to maintain a predetermined voltage across said electrodes being a capacitor, with the circuitry of said device being either said capacitor alone and using external charging means to charge said device, or with a charging means being contained within said device and said device charging itself;

whereby said animal repelling and training device functions much like a portable, baited, wireless, electric fence without the disadvantages and dangers associated with an electric fence.

2. A method of repelling and training animals comprising the steps of:

(a) deploying baited, portable, wireless, high voltage, shock-producing devices around articles or areas to be protected, with said devices using a capacitor to maintain said high voltage across bare electrodes with the circuitry of said device being either said capacitor alone and using external charging means to charge said device, or with a battery and charging means being contained within said device and the device charging itself, and (b) providing bait on said shock-producing devices to attract pest animals to the devices whereupon said animals receive a high voltage electric shock having low amperage and short duration and are frightened from the area, and (c) maintaining said shock-producing devices in the area to be protected to provide a scarecrow effect and so train the animals to avoid the protected area.

* * * * *

Disclaimer 5,894,818 — Keith Betzen. P.O. Box 5604, Bloomington, Ind. 47407-5604. ELECTRIC ANIMAL REPELLING AND TRAINING DEVICE. Patent dated April 20, 1999. Disclaimer filed October 15, 2002, by the Inventor.

The term of this patent shall not extend beyond the expiration date of Patent No. 6,014,951.

*(Official Gazette, August 26, 2003)*